United States Patent [19]
Neitzke et al.

[11] Patent Number: 5,281,055
[45] Date of Patent: Jan. 25, 1994

[54] FLOATING DOCK

[75] Inventors: Jack A. Neitzke, Fountain City, Wis.; Clifton Vierus, Minnesota City, Minn.

[73] Assignee: EZ Dock, Inc., Winona, Minn.

[21] Appl. No.: 916,310

[22] Filed: Jul. 17, 1992

[51] Int. Cl.⁵ .............................................. B63C 1/00
[52] U.S. Cl. .................................... 405/219; 405/218; 114/263
[58] Field of Search ............... 405/219, 218, 220, 221, 405/211.1, 215, 204, 195.1; 114/263, 266, 267; 404/40, 32, 36, 34, 35, 44, 45; 14/27-30, 69.5; 238/8

[56] References Cited

U.S. PATENT DOCUMENTS

| | | |
|---|---|---|
| 886,077 | 4/1908 | Rowe .................. 404/40 X |
| 2,792,164 | 5/1957 | Cauffiel ................ 404/34 X |
| 3,654,885 | 4/1972 | Godbersen . |
| 3,752,102 | 8/1973 | Shuman . |
| 3,824,644 | 7/1974 | Stranzinger ............ 404/40 X |
| 3,869,532 | 3/1975 | Shirrell . |
| 4,008,506 | 2/1977 | Smith . |
| 4,043,287 | 8/1977 | Shorter, Jr. . |
| 4,070,980 | 1/1978 | Shorter, Jr. . |
| 4,365,577 | 12/1982 | Heinrich ............... 405/219 X |
| 4,474,504 | 10/1984 | Whitman et al. ....... 404/40 X |
| 4,543,903 | 10/1985 | Kramer . |
| 4,577,448 | 3/1986 | Howorth ............... 404/40 X |
| 4,604,962 | 8/1986 | Guibault ............... 404/40 X |
| 4,768,456 | 9/1988 | Jones et al. . |
| 4,799,445 | 1/1989 | Meriwether . |
| 4,852,509 | 8/1989 | Fransen et al. . |
| 4,860,952 | 8/1989 | Schmidt ............... 404/32 X |
| 4,928,617 | 5/1990 | Meriwether . |
| 4,938,629 | 7/1990 | Boudrias .............. 405/219 X |
| 4,955,311 | 9/1990 | Barber ................. 405/219 X |
| 4,962,716 | 10/1990 | Fransen et al. . |
| 4,974,538 | 12/1990 | Meriwether ............ 405/219 X |
| 4,998,717 | 3/1991 | Vaux ................... 404/32 X |
| 5,201,467 | 4/1993 | Kennel et al. .......... 404/40 X |

FOREIGN PATENT DOCUMENTS

| | | | |
|---|---|---|---|
| 1534368 | 5/1969 | Fed. Rep. of Germany | 404/40 |
| 1232881 | 10/1960 | France | 404/40 |
| WO88/03107 | 5/1988 | World Int. Prop. O. . | |

Primary Examiner—Randolph A. Reese
Assistant Examiner—J. Russell McBee
Attorney, Agent, or Firm—Fredrikson & Byron

[57] ABSTRACT

The present invention concerns a floating dock which is economical, durable and easy to install and maintain. The dock is comprised of uniform floating docking sections coupled together with rubber male-type anchors which fit into female-type receiving sockets on the docking sections. The two anchors of the couplers are secured together by a tie rod. The docking sections eliminate the need for boat bumpers, wood planking or other additional parts and expenses but allow for the attachment of desired accessories such as spud pipes, gang planks and tie-up cleats. The versatile docking sections can be arranged in an unlimited number of dock designs.

12 Claims, 2 Drawing Sheets

FLOATING DOCK

FIELD OF THE INVENTION

The present invention relates to floating docks, and, in particular, to durable polyethylene docking sections with couplers and sockets that allow the sections to be connected in a variety of layouts without the need for additional parts or expenses.

BACKGROUND OF THE INVENTION

Floating docks are commonly used, particularly on lakes and bays, as a means of mooring boats and the like. Modular or sectional docks are frequently employed for constructing docks of various sizes and configurations. In the past, metal or styrofoam floatation cores encased in concrete shells have commonly been used as the basis for docking modules. The desired attachments are then connected to these structures to produce the dock. These modules, however, suffer from many disadvantages, such as deteriorating in certain environments, and are, therefore, limited in their applications.

The apparatus connecting modular docks together must be flexible enough to allow for the angular movement that will naturally occur from the action of wind and waves against the dock, yet be strong enough to keep the sections from breaking apart while under stress. Some prior art docks have attempted to solve these problems by securing the docking sections together with relatively long cables or springs. These devices, however, can leave large gaps between the individual docking sections resulting in an unsafe condition as users have to step over the gaps to travel along the dock. Additionally, such gaps allow more movement to occur between each docking section, thereby causing the overall dock configuration to lose its shape and the connecting apparatus to weaken. Thus, apparatus connecting the sections together, while being strong and flexible, should ideally also hold the sections closely together.

The docks should also be relatively easy to install as well as remove, if desired. As each boater's requirements will be unique, the docking sections should allow for a versatile array of dock arrangements to be constructed. Some of the prior art docks, however, can only be assembled in a limited number of configurations. Other systems require the owner to purchase extra parts, such as boat bumpers or wood planking, before the docks are complete and can be used.

Additionally, to achieve the required combination of strength and flexibility, many of the prior art docks contain complicated connecting apparatus that has a large number of parts and is difficult to assemble. Furthermore, these systems are more prone to wear and are much more likely to break down and require replacement. Yet these apparatus are also frequently difficult to access and repair, resulting in costly and laborious maintenance.

A need exists, therefore, for a modular floating dock that is simple to assemble and maintain, that is complete and ready to use after assembly and that is durable and flexible enough to be used in a variety of settings.

SUMMARY OF THE INVENTION

The present invention provides an economical, flexible and durable floating dock for mooring boats and other functions. The individual docking sections can be connected together by attachment means to form unlimited design layouts. The attachment means are comprised of an upper and lower generally symmetrical male-type anchor and a flexible tie rod attached between the anchors for limiting the anchors motion away from each other. The anchors contain flanges at their ends and are positionable within similarly shaped female-type receiving sockets located on the top and bottom surface of the docking members.

The docking members are connected together by loosening the tie rod between the upper and lower anchors and inserting the lower anchor into the two sockets on the bottom surface of the two docking members that are to be joined. The upper anchor is then inserted into the two corresponding sockets on the top surface of the docking members which are vertically above the sockets in which the lower anchor is inserted. The tie rod between the upper and lower anchors is then tighten.

DETAILED DESCRIPTION OF THE INVENTION

Figure 1:
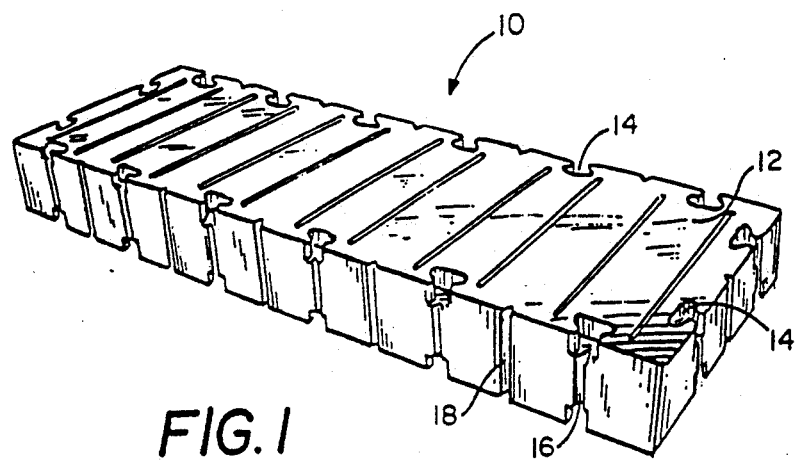
FIG. 1 is a perspective view of a floating docking member.
Figure 2:
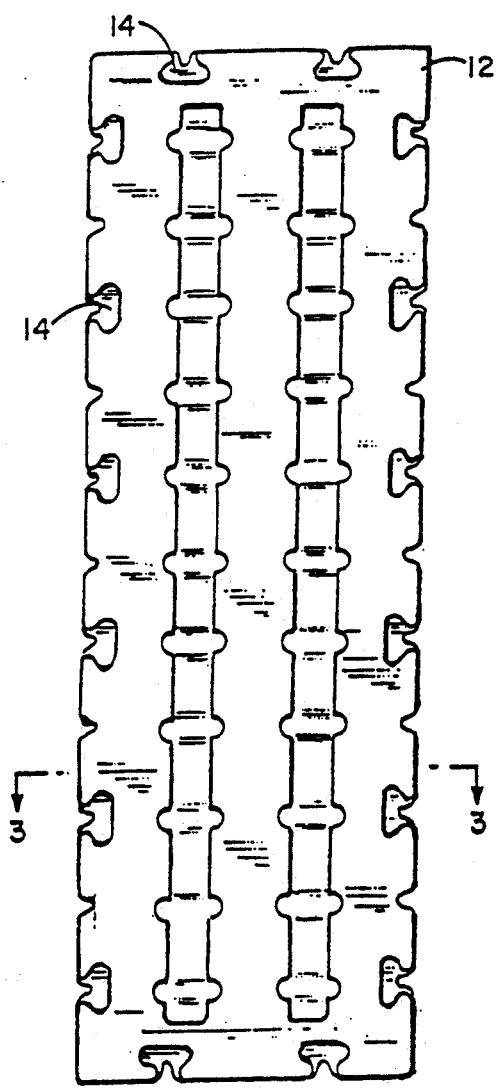
FIG. 2 is a bottom view of the a docking member.
Figure 3:
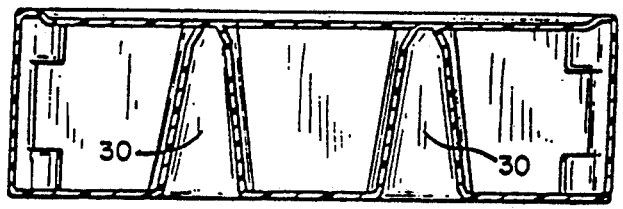
FIG. 3 is a cross sectional view of the docking member taken along line 3—3.
Figure 5:
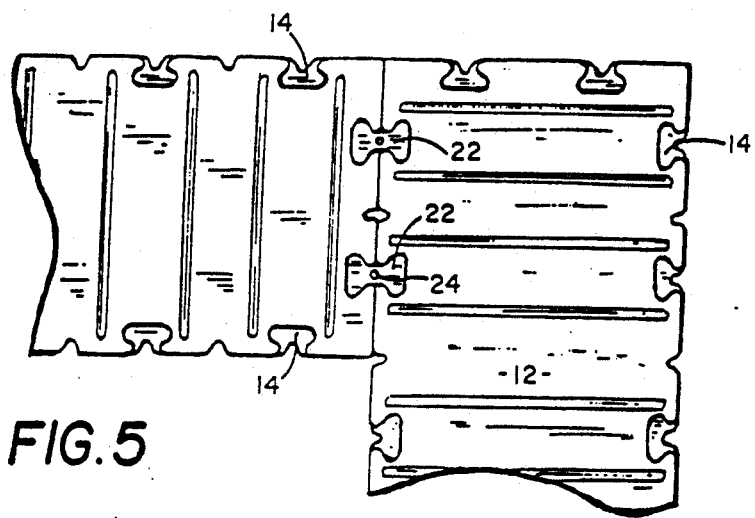
FIG. 5 is a top view of two dock members coupled together.
Figure 4:
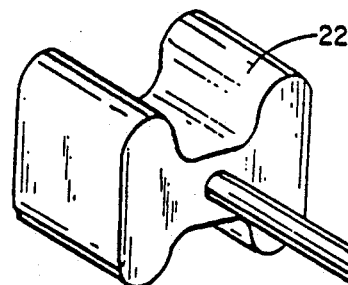
FIG. 4 is a perspective view of an attachment coupler.
Figure 6:
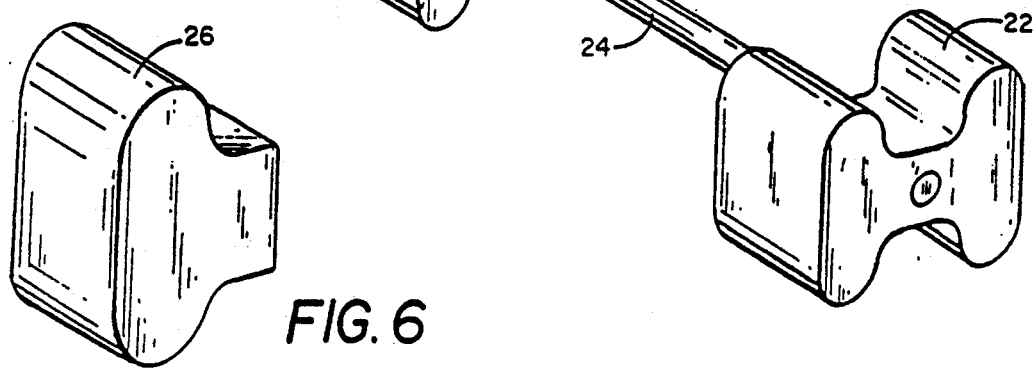
FIG. 6 is a perspective view of an end piece.

The present invention concerns a floating dock, generally designated 10 in FIG. 1. Each docking member 12 is a self floating one piece molded construction section. In the preferred embodiment, the top surface of the docking members 12 is symmetrical about both its longitudinal and lateral axis.

The docking members 12 can be constructed of any suitable material. In the preferred embodiment, the docking members are made of specialized molded polyethylene. Polyethylene possesses strength and durability, is resistant to gas, oil and other contaminants that are found in water environments and is also quite stable on the water. The process of producing molded polyethylene is well known in the art in need not be explained here in detail. Polyethylene floats are disclosed in U.S. Pat. No. 3,752,102 by Shuman and U.S. Pat. No. 4,928,617 by Meriwether and a method of manufacturing floating docking modules is disclosed in U.S. Pat. No. 3,869,532 by Shirrell, these patents being herein incorporated by reference.

The shape and dimensions of the docking members 12 can vary depending upon their intended location and design, however, generally it is preferred that the members 12 be relatively small so that they can accommodate the greatest number of situations. A small docking member allows the dock to be used in locations with tight dimensions, and allows the docking member to be used in larger locations simply by attaching as many members together as are needed.

In the preferred embodiment, each docking section is generally rectangular in shape and 117 inches long, 39.9 inches wide, 14.5 inches high and weighs approximately 160 lbs. Also in the preferred embodiment, the top of the docking members 12 is textured and includes a non-slip walking surface as a safety feature.

Each docking member 12 is desirably generally hollow. The thickness of the wall of the docking member 12 can vary with need but should desirably be in the range of 0.19 to 0.63 inches, with a wall thickness of approximately 0.25 inches being preferred. Within the hollow cavity of the docking member 12, elongate struts stretch from the bottom surface to the top surface. These struts provide additional structural support for the docking member 12 as well as prevent sagging of the deck when pressure is applied (as when a person walks upon the deck.)

The struts can be of any suitable formation. In the preferred embodiment, portions of the bottom surface extend upwardly into the interior of the docking member 12 towards the top surface to form a series of tapered generally frustoconically shaped pylons 30. The struts desirably include pylons with an arcuate top connected by slightly taller and wider pylons. In the preferred embodiment, two generally parallel strips of pylons run along the length of the bottom surface of the docking member 12. When the docking member 12 is positioned on the water, air is trapped within the pylons 30, thereby allowing the docking member 12 to remain afloat in the event that it becomes damaged and water begins to enters the cavity.

Located around the perimeter of the top and bottom surfaces of the docking sections 12 are coupler receiving sockets 14. The sockets 14 are desirably uniformly spaced along all four sides of the docking section 12. In the preferred embodiment, an equal number of sockets 14 are located on both the top and bottom surfaces of the sections 12, with each socket 14 on the top surface having a corresponding socket 14 generally vertically below it on the bottom surface. The surfaces can have any appropriate number of sockets 14, however in the preferred embodiment, six sockets are located along both lengths of the sides of each docking section 12 and two sockets are located on both ends of the docking section 12.

Coupler grooves 16 and accessory grooves 18 desirably run in a generally vertically direction along the side walls of the docking members 12. The coupler grooves 16 desirably run from a socket 14 on the top surface down to the corresponding socket 14 on the bottom surface, while the accessory grooves 18 desirably are located between the pairs and top and bottom sockets 14. The coupler and accessory grooves 16,18 assist in the attachment of the couplers 20 and accessories and also serve to add strength to the side walls.

The sockets 14 are symmetrical about their lateral axis and open on the end leading to the coupler groove 16. The sockets 14 are intended to receive the couplers 20, as described below, in a locking relationship and are thus shaped accordingly. While the design of the sockets 14 can vary appropriately, in the preferred embodiment, they are comprised of recesses patterned similarly to a T-shape with rounded edges. The sides of the socket 14 extend beyond the opening of the socket to help secure the anchor 22 of the coupler 20 within.

Connectors are used to attach the docking sections 12 together as wall as to attach other devices to the sections. The docking sections 12 are connected together through the use of couplers 20. Each coupler 20 contains two anchors pieces 22 that are secured together by a tie rod 24.

The anchors 22 are symmetrical about both their longitudinal and lateral axis and are desirably shaped so that each end can fit snugly into a receiving socket 14 on the docking members 12. Each end of the anchors 22 desirably flares out into a flange so that the it is wider at its ends than at its middle. The anchors 22 can be constructed of any suitable material and in the preferred embodiment, they are made of rubber. The rubber construction results in an anchor 22 that can be positioned tightly into the sockets 14 with sufficient strength to withstand the torsional stresses exerted upon it when in the socket by the actions of the waves and wind, yet is also flexible enough to be compressed by these forces without losing much of its strength or resiliency. Also in the preferred embodiment, the anchors 22 have the added environmental benefit of being made from recycled tires.

The tie rods 24 act to bridge the anchors 22 together. Any appropriate attachment means can be used, but they should desirably be flexible enough to allow for some movement of the anchors 22, yet be strong enough to ensure that the anchors 22 remain securely fitted within the sockets 14 on the docking sections 12.

Additionally, as the tie rods 24 will frequently come into contact with the water, they should be properly insulated or constructed from a corrosion resistant material so as to avoid accelerated weakening. In the preferred embodiment, DELRIN rods are used for the tie rods 24.

The anchors 22 can be secured to the tie rods 24 by any suitable attachment means. In the preferred embodiment, a hole is desirably located in the anchors 22 generally at their center and the anchors 22 are secured to the tie rods 24 by inserting the tie rod 24 through the hole and attaching a nut or other appropriate attachment device to it. The length of the tie rod 24 is of a dimension that is desirable slightly shorter than the height of the docking member 12 so that when in position, the anchors 22 are fitted tightly within the sockets 14 securing the coupler in place and preventing undue movement of the docking members 12.

The docking members 12 are versatile enough to accommodate most desired accessories, such as spud pipe brackets or gang planks. A variation of the anchors 22 can be used with the connectors to attach the accessories to the docking members 12. As these devices are external parts that are attached to only one docking member, they do not require a complete coupler. Generally, an anchor with only one flange is needed and in the preferred embodiment, half an anchor or end piece is used.

Any appropriate arrangement can be used to attach the accessories to the docking members 12. In the preferred embodiment, however, the end pieces 26 are attached to the braces on the accessories with bolts, screws or other suitable attachment means. The length of the braces is desirably approximately equal to the distance between either a pair of vertical or horizontal adjacent sockets 14 on the docking members 12. Four end pieces 26 are then preferably attached to the braces in locations corresponding to four adjacent sockets 14 on a docking member 12 (two on the top surface and two on the bottom surface.) Having equal spacing between the sockets 14 allows the accessories to be attached at either end of the docking members 12 or anywhere along the sides of the docking members 12.

The docking members 12 desirably include means for allowing the use of tie-up cleats 28. The tie-up cleats 28 can be located at any appropriate position on the docking members 12 and in the preferred embodiment, they are attached near the accessory grooves 18 through the use of nuts molded into the docking members 12 and suitable attachment means. The tie-up 28 cleats serve to assist in securing boats to the dock.

In use, the docking sections 12 are connected together in the desired design. If desired, any docking member 12 can be secured to the shore through the use of any suitable means, such as arms and cables or gang planks. Similarly, any docking member 12 can be anchored in the water by attaching it to something already secured in the water, such as a spud pipe. To affix a docking member 12 to a spud pipe, for example, the spud pipe bracket is first attached to the docking member by screwing or bolting the four end pieces 26 to the brace portion of the bracket. Two end pieces 26 are attached to the top portion of the bracket and two end pieces 26 are attached to the bottom portion of the bracket. The end pieces 26 are then inserted into four corresponding sockets 14 at the desired location on the docking member 12, forming a secure fit. The bracket is then secured loosely around the spud pipe to allow for the vertical movement of the dock.

The individual docking members 12 are connected together with the couplers 20. The two docking members 12 to be connected are positioned next to each other so that two pairs of sockets 14 on each member line up. One of the anchors 22 on a coupler 20 is loosened from the tie rod 24. The other anchor 22 in fitted into one of the sockets 14 on the bottom surface of each docking members 12. The tie rod 24 is then stretched until the other anchor 22 can be positioned into the sockets 14 directly above the sockets 14 holding the first anchor 22. When both anchors are in position, the coupling groove 16 helps to ensure that the tie rod 24 is flush within the groove 16 and not rubbing against the sides of the docking members 12. This procedure is repeated for the other coupler 20 and is corresponding sockets 14. Once both anchors 22 are placed within the sockets 14 on the top surface of the two docking members 12, the tie rods 24 are tightened to produce a snug fit between the two anchors 22.

After the floating dock has been set up, gang planks or other desired accessories can be attached to the dock member 12 in a manner similar to that of attaching the spud pipe bracket. Tie-up cleats 28 can also fastened to the docking members 12 desirably by screwing them into the holes located on the top surface of the docking members 12 on either side of the accessory groove 18. In the preferred embodiment, seven sets of holes are molded into the top surface of the docking members 12 and each hole contains a stainless steel or other corrosion resistant T-nut for threadingly attaching the tie-up cleats 28.

The present invention is a complete dock that does not require additional elements for use, such as boat bumpers or wood planking, or additional parts for assembly. The polyethylene docking sections are very durable and stable in the water yet also have a very long life. The anchors, being made of rubber, are capable of being subjected to repeated compression and torsional forces that normally occur on lakes from the action of the wind and waves without failing. Additionally, the shape of the anchors and receiving sockets helps to ensure that the anchors will remain secure and the docking sections will not separate during use. The couplers also result in a tight fit and a very small gap between the docking members thereby increasing the ease and safety of walking on the dock. Furthermore, the minimal parts that make up the couplers and the accessibility of the couplers make their repair and maintenance easy to accomplish.

While a preferred embodiment of the present invention has been described, it should be understood that various changes, adaptations and modifications may be made therein without departing from the spirit of the invention and the scope of the appended claims.

What is claimed is:

1. A floating dock, comprising:
    at least two docking members having top and bottom surfaces, each docking member containing a plurality of female-type receiving sockets spaced along the perimeter of the top and bottom surfaces of the docking member; and,
    a generally symmetrical male-type anchor with a pair of flanges, each flange being positionable within a receiving socket of one of the docking members for securing the docking members together in a flexible manner.

2. The floating dock of claim 1 wherein an upper anchor is positioned within two sockets on the top surface of two docking members and a lower anchor is positioned within the two vertically corresponding sockets on the bottom surface of the docking members.

3. The floating dock of claim 2 further including a flexible tie rod attached between the upper and lower anchors for limiting the anchors motion away from each other.

4. The floating dock of claim 3 wherein the anchors are constructed of rubber.

5. The floating dock of claim 2 including end pieces for attaching accessories to the docking members, the end pieces comprising anchors containing only one flange.

6. The floating dock of claim 1 wherein the docking members are one-piece self-floating sections made of molded polyethylene.

7. A floating dock, comprising:
    at least two self-floating polyethylene docking members having a top and bottom surface, each docking member containing a plurality of female-type receiving sockets spaced along the perimeter of the top and bottom surfaces of the docking member;
    an upper and lower generally symmetrical male-type anchor positionable within the female-type receiving sockets of the docking members, the anchors having flanges on either end;
    flexible tie rods attached between the anchors, and,
    end pieces for attaching accessories to the docking members, the end pieces comprising anchors with only one flange.

8. A floating dock, comprising:
    a docking member with top, bottom and side surfaces defining a hollow cavity and a generally frustoconically shaped pylon within the cavity extending from the top surface to the bottom surface.

9. The floating dock of claim 8 wherein the base of the pylon defines a hole in the bottom surface of the docking member so that air is captured within the pylon when the docking member is positioned in water.

10. The floating dock of claim 9 wherein two strips of pylons extend along the length of the docking member.

11. The floating dock of claim 10 wherein the docking member is made of molded polyethylene.

12. A floating dock, comprising:

at least two self-floating polyethylene docking members having top, bottom and side surfaces defining a hollow cavity;

a plurality of generally frustoconically shaped pylons extending within the cavities from the top surface to the bottom surface of the docking members, the base of the pylons defining a hole in the bottom surface of the docking members so that air is captured within the pylons when the docking members are positioned in water;

a plurality of female-type receiving sockets spaced along the perimeter of the top and bottom surfaces of the docking member;

an upper and lower generally symmetrical male-type anchor positionable within the female-type receiving sockets of the docking members, the anchors having flanges on either end; and flexible tie rods attached between the anchors.

* * * * *

(12) REEXAMINATION CERTIFICATE (4414th)

United States Patent
Neitzke et al.

(10) Number: US 5,281,055 C1
(45) Certificate Issued: Aug. 14, 2001

(54) FLOATING DOCK

(75) Inventors: Jack A. Neitzke, Fountain City, WI (US); Clifton Vierus, Minnesota City, MN (US)

(73) Assignee: Marine Floats, Inc., Winona, MN (US)

Reexamination Request:
No. 90/005,482, Sep. 7, 1999

Reexamination Certificate for:
| | |
|---|---|
| Patent No.: | 5,281,055 |
| Issued: | Jan. 25, 1994 |
| Appl. No.: | 07/916,310 |
| Filed: | Jul. 17, 1992 |

(51) Int. Cl.$^7$ .................................................. B63C 1/00
(52) U.S. Cl. .......................... 405/219; 405/218; 114/263

(56) References Cited

U.S. PATENT DOCUMENTS

| | | |
|---|---|---|
| 2,792,164 | 5/1957 | Cauffiel . |
| 3,561,375 | 2/1971 | Hammond . |
| 3,780,686 | 12/1973 | Brill . |
| 3,964,221 | 6/1976 | Berquist . |
| 4,418,634 | 12/1983 | Gerbus . |
| 4,660,495 | 4/1987 | Thompson . |
| 4,886,276 | 12/1989 | Digangi et al. . |
| 5,125,355 | 6/1992 | Stranzinger . |

FOREIGN PATENT DOCUMENTS

| | | |
|---|---|---|
| 1058586 | 2/1966 | (GB) . |

OTHER PUBLICATIONS

EZ Dock, Inc., "Self–floating Dock and Lift Systems," pp. 1–9, 1999.*

Schafer Systems Inc., "Connect–A–Dock," pp. 1–2, undated.*

Rotational Molding, *The Introductory Guide to Designing Rotationally Molded Plastic Parts*, p. 9, Association of Rotational Molders, 1982.

Rotational Molding Processes and Innovations, p. 4, (undated).

Gordon and Breach, *Basic Principles of Rotational Moldings*, 1971, p. 41.

U.S. Army Materiel Command, *Engineering Design Handbook*, Apr, 1975, pp. i, 2–7, 2–8.

The Association of Rotational Molders, *The Engineer's Guide to Designing Rotationally Molded Plastic Parts*, 1982, pp. 2, 12 13.

The Association of Rotational Molders, Introduction to Rotational Molding Seminar, 1985, 1991, 1996, pp. 1–7.

*Roto–Molder Review*, Sep./Oct. 1986, pp. 1–2.

* cited by examiner

*Primary Examiner*—Frederick L. Lagman

(57) ABSTRACT

The present invention concerns a floating dock which is economical, durable and easy to install and maintain. The dock is comprised of uniform floating docking sections coupled together with rubber male-type anchors which fit into female-type receiving sockets on the docking sections. The two anchors of the couplers are secured together by a tie rod. The docking sections eliminate the need for boat bumpers, wood planking or other additional parts and expenses but allow for the attachment of desired accessories such as spud pipes, gang planks and the tie-up cleats. The versatile docking sections can be arranged in an unlimited number of dock designs.

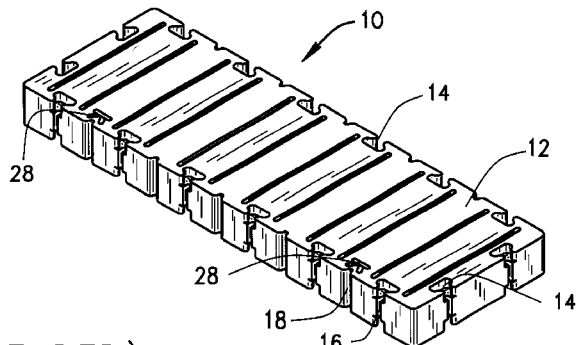

(AMENDED)

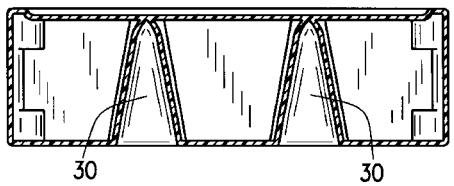

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 5, Lines 43–55:

After the floating dock has been set up, gang planks or other desired accessories can be attached to the dock member 12 in a manner similar to that of attaching the spud pipe bracket. Tie-up cleats 28 can also *be* fastened to the docking members 12 desirably by screwing them into the holes located on the top surface of the docking members 12 on either side of the accessory groove 18. In the preferred embodiment, seven sets of holes are molded into the top surface of the docking members 12 and each hole contains a stainless steel or other corrosion resistant T-nut for threadingly attaching the tie-up cleats 28.

AS A RESULT OF REEXAMINATION, IT HAS BEEN DETERMINED THAT:

The patentability of claims 1–12 is confirmed.

New claims 13—20 are added and determined to be patentable.

*13. A floating dock comprising*
*a docking member with top, bottom and side surfaces defining an enclosed air filled hollow cavity, and a generally frustoconically shaped reinforcing pylon within the enclosed air filled hollow cavity extending from the top surface to the bottom surface, each such pylon at the bottom surface having an opening sufficient to allow air to also be captured within the pylon when the bottom surface of the docking member is positioned in water.*

*14. The floating dock as defined in claim 13 including at least two pylons that extend substantially between the side surfaces of the docking member.*

*15. The floating dock us defined in claim 14 in which the at least two pylons are generally parallel to one another.*

*16. The floating dock as defined in claim 15 in which the docking member has a length greater than its width and the at least two pylons extend along the length of the docking member.*

*17. The floating dock as defined in claim 16 in which the docking member has a generally rectangular configuration with a plurality of pairs of opposing side surfaces each of which extends substantially transverse to generally parallel top and bottom surfaces.*

*18. The floating dock as defined in claim 13 in which the side surfaces are generally perpendicular to the bottom and top surfaces.*

*19. The floating dock as defined in claim 8 in which the side surfaces extend substantially only between the top and bottom surfaces of the docking member.*

*20. A floating dock comprising at least two docking members, said docking members being adapted to be connected together to form said floating dock; each said docking member comprising top, bottom and side surfaces defining a hollow cavity and a generally frustoconically shaped pylon within the cavity extending from the top surface to the bottom surface.*

* * * * *